(12) United States Patent
Okada et al.

(10) Patent No.: US 7,612,800 B2
(45) Date of Patent: Nov. 3, 2009

(54) IMAGE PROCESSING APPARATUS AND METHOD

(75) Inventors: Ryuzo Okada, Kanagawa-ken (JP); Kazunori Onoguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 769 days.

(21) Appl. No.: 10/607,045

(22) Filed: Jun. 27, 2003

(65) Prior Publication Data
US 2004/0057599 A1 Mar. 25, 2004

(30) Foreign Application Priority Data
Jun. 27, 2002 (JP) ............................. 2002-187091

(51) Int. Cl.
*H04N 5/225* (2006.01)
*G06K 9/00* (2006.01)

(52) U.S. Cl. ....................................... 348/169; 382/107

(58) Field of Classification Search ................. 348/119, 348/135, 149, 116, 118, 148, 113, 143, 169, 348/416, 416.1, 699, 142, 139, 222, 363, 348/61; 382/103, 104, 43, 49, 107, 157, 382/199, 154, 190, 218, 276, 283, 128, 220; 340/435, 436; 375/240, 240.01, 240.08
See application file for complete search history.

(56) References Cited

U.S. PATENT DOCUMENTS

| | | | | |
|---|---|---|---|---|
| 4,970,653 A * | 11/1990 | Kenue | ................. | 364/461 |
| 5,331,312 A * | 7/1994 | Kudoh | ................. | 340/541 |
| 5,410,346 A * | 4/1995 | Saneyoshi et al. | ........... | 348/116 |
| 5,461,357 A * | 10/1995 | Yoshioka et al. | ............ | 340/435 |
| 5,777,690 A * | 7/1998 | Takeda et al. | ............... | 348/699 |
| 6,185,314 B1 * | 2/2001 | Crabtree et al. | ............. | 382/103 |
| 6,205,242 B1 * | 3/2001 | Onoguchi | ................... | 382/154 |
| 6,456,730 B1 * | 9/2002 | Taniguchi | .................. | 382/107 |
| 6,488,109 B1 * | 12/2002 | Igaki et al. | .................. | 180/169 |
| 6,842,531 B2 * | 1/2005 | Ohtsuka et al. | ............. | 382/104 |
| 6,901,110 B1 * | 5/2005 | Tsougarakis et al. | ... | 375/240.12 |

(Continued)

FOREIGN PATENT DOCUMENTS

JP 7-28975 1/1995

(Continued)

OTHER PUBLICATIONS

Stefan Carlsson, et al. "Object detection using model based prediction and motion parallax.", 1990, pp. 297-306.

(Continued)

*Primary Examiner*—Behrooz Senfi
(74) *Attorney, Agent, or Firm*—Oblon, Spivak, McClelland, Maier & Neustadt, L.L.P.

(57) ABSTRACT

An image processing apparatus includes an image input unit that receives time-series images, and a candidate area tracking unit that extracts a line segment in a specific direction, sets an obstacle candidate area in a vicinity of the detected line segment, and searches the vicinity of the line segment extracted in each frame, thus tracking the obstacle candidate area with low computational cost. Using the tracking result of tracking a group of three or more candidate areas, a plane assumption verifier determines to which of the preset planes these candidate areas belong. On the basis of the result by the plane assumption verifier, an obstacle detector detects an obstacle and estimates the position of the obstacle.

16 Claims, 8 Drawing Sheets

U.S. PATENT DOCUMENTS

| | | | |
|---|---|---|---|
| 6,993,159 B1 * | 1/2006 | Ishii et al. | 382/104 |
| 2002/0134151 A1 * | 9/2002 | Naruoka et al. | 73/291 |
| 2003/0235327 A1 * | 12/2003 | Srinivasa | 382/104 |
| 2004/0184638 A1 * | 9/2004 | Nobori et al. | 382/104 |

FOREIGN PATENT DOCUMENTS

| | | |
|---|---|---|
| JP | 7-280517 | 10/1995 |

OTHER PUBLICATIONS

Zhongfei Zhang, et al., "Obstacle Detection Based on Qualitative and Quantitative 3D Reconstruction", IEEE Transaction on Pattern Analysis and Machine Intelligence, vol. 19, No. 1, Jan. 1997, pp. 1-13.

Zhencheng Hu, et al., "Real-time Multi Moving Objects Detection and Tracking from Dynamical Road Scene Using FOE", 1999, 10 pages.

Terence Click Hion Heng, et al, "Active Sensor Fusion for Collision Avoidance in Bahaviour-Based Mobile Robots", IEICI Trans, Inf. & Syst., vol. E81-D, No. 5, May 1998, pp. 448-456.

* cited by examiner

IMAGE PROCESSING APPARATUS AND METHOD

CROSS-REFERENCE TO RELATED APPLICATIONS

The present application claims priority to Japanese Patent Application No. 2002-187091 filed in the Japanese Patent Office on Jun. 27, 2002, the disclosure of which is incorporated herein by reference.

BACKGROUND OF THE INVENTION

1. Field of the Invention

The present invention relates to image processing apparatuses and methods for detecting, by using images captured by a television camera mounted on a moving object such as an automobile, an obstacle to the moving object.

2. Discussion of the Background

Proposed methods for detecting an obstacle in the vicinity of a vehicle such as an automobile are classified into two types: one using radar and the other using images.

The method using radar often employs laser radar (Japanese Patent Application No. 9-30798) or millimeter wave radar (Japanese Unexamined Patent Application Publication No. 2001-42025). The method using millimeter wave radar has problems in that it cannot distinguish between a wave reflected from the road surface and a wave reflected from a stationary obstacle and that an apparatus implementing the method is expensive. The method using radar has a problem in that it cannot determine whether or not a detected obstacle is on a travel path of the vehicle mounting such a radar system.

In contrast, the method using images detects a vehicle's travel lane (Nakayama, Kubota, Taniguchi, and Onoguchi, "Detection of white line by tracking candidate on back projected image," Technical Report of Proc. of IEICE, Vol. 101, No. 302, pp. 15-22, 2001) and distinguishes between the road surface and an obstacle that is not on the road surface (Japanese Unexamined Patent Application Publication No. 2001-283204; and Okada, Taniguchi, and Onoguchi, "Obstacle detection by monocular on-vehicle camera using virtual plane tracking method," Technical Report of Proc. of IEICE, Vol. 101, go. 302, pp. 29-36, 2001). Therefore, the method is capable of detecting an obstacle that is on the vehicle's travel path and that may collide with the vehicle. An apparatus implementing the method is inexpensive.

The method using images is classified into two types: one using a plurality of television cameras and the other using a single television camera.

The method using a plurality of television cameras includes a method of detecting an obstacle by measuring distance on the basis of the principle of triangulation (Japanese Unexamined Patent Application Publication No. 2000-207693) and a method of detecting an object not being on the road surface as an obstacle (Japanese Unexamined Patent Application Publication No. 2000-293693). The method using a plurality of cameras involves calibration of the cameras, and the configuration of an apparatus implementing the method is complicated. The apparatus including the plural cameras is more expensive than an apparatus including a single camera.

The method using a single camera includes a method of detecting a horizontal edge line as a preceding vehicle's ground line (Japanese Unexamined Patent Application Publication No. 7-280517 and Japanese Unexamined Patent Application Publication No. 7-28975). This method may make a detection error since the detected edge line may be the seam of an asphalt road or the border of road markers painted on a road surface.

In S. Carlsson and J. O. Eklundh, "Object detection using model based prediction and motion parallax," Proc. of ECCV, pp. 297-306, 1990, the motion of the road surface is estimated using the motion of a set of points in an image, and an area that moves differently from the motion of the road surface is detected as an obstacle area.

As in this technique, a technique for estimating the motion of the road surface requires that the road surface occupy a large image region relative to obstacles and that the road surface must have a clear texture (a road marker, e.g., a lane marker or a pedestrian crossing). Such conditions may not often be satisfed by the actual road scenes.

In Ko and Uchimura, "Detection and simultaneous tracking of a plurality of moving bodies in changing background," IEEJ Transactions on Industry Applications, Vol. 120, No. 10, a vehicle's traveling direction is estimated from the motion of a set of points in an image, and an area moving in a direction differing from the moving direction of the background is detected as an obstacle. On the basis of the geometrical relationship between the television camera and the road surface, a change in distance from the vehicle to the obstacle is computed. A moving object that moves at a speed differing from the vehicle's relative speed with respect to the road surface is also detected as an obstacle. This technique has a problem in that it cannot detect a stationary object on the road.

In Zhang, et al., "Obstacle detection based on qualitive and quantitative 3D reconstruction," IEEE Transactions on Pattern Analysis and Machine Intelligence, Vol. 19, No. 1, pp. 15-26, 1997, a case is described in which some of the features in an image are on the road surface and the other features belong to an obstacle. In such a case, on the basis of the fact that the motion of the features cannot be described in terms of the motion in a three-dimensional plane, an obstacle is detected when the motion of a set of features cannot be described in terms of planar motion. This technique needs a sufficient number of features belonging to both the road surface and the obstacle. In the actual road scene, there may be almost no features on the road surface.

Since misestimating correspondences of features over images causes a detection error, this technique is difficult to use in the actual environment.

In contrast, in Okada, et al., "Obstacle detection by monocular on-vehicle camera using virtual plane tracking method," two virtual planes whose directions are respectively identical to that of the road surface and an obstacle are arranged in a scene for an image region, and are tracked in an image sequence. A virtual plane in which the tracking result best matches the current image is selected, thus distinguishing between the obstacle and the road surface.

This technique also utilizes motion parallax between the road surface and the obstacle. Since this technique requires no features on the road surface, this technique is easily applicable to the actual road scene. Since this technique does not track the feature points based on local information, but tracks the planes, stability is improved. On the other hand, this technique involves high computational cost because it tracks many planes.

In order to realize the method based on motion parallax between the road surface and the obstacle under the actual environment, the video-rate image processing is necessary, and the detection result must be accurate. The motion parallax needs to be reliably computed with low computational cost.

SUMMARY OF THE INVENTION

Accordingly, it is an object of the present invention to provide an image processing apparatus and method for implementing a scheme for reliably detecting, by using a single television camera, an obstacle with low computational cost on the basis of motion parallax between the road surface and the obstacle.

An image processing apparatus according to an aspect of the present invention includes an image input unit for inputting time-series images; a candidate area tracking unit for setting an obstacle candidate area in a specific area of each of the input time-series images and tracking the candidate area in the images; a plane assumption verifier for determining, using the tracking result of tracking a group of three or more candidate areas, whether or not the candidate areas belong to a specific plane; and an obstacle detector for detecting an obstacle using the result of verifying the plane assumption. The candidate area tracking unit includes a line segment detector for detecting a line segment in a specific direction from the specific area of each of the input time-series images; an obstacle candidate area generator for generating an obstacle candidate area in the vicinity of the detected line segment; a search area setting unit for setting an area in the vicinity of the line segment in the specific direction, which is detected in each image frame, as a search area for the obstacle candidate area; and an obstacle candidate area search unit for searching the search area for an area having a feature similar to an image feature in the obstacle candidate area.

When a trajectory of the tracked obstacle candidate area is not smooth, the candidate area tracking unit may terminate tracking the obstacle candidate area from being tracked.

The plane assumption verifier may include a candidate area group selecting unit for selecting a candidate area group consisting of three or more obstacle candidate areas; and a plane assumption evaluating unit for computing a fitness between motion of the candidate area group and a predetermined plane and evaluating whether or not the candidate area group belongs to the plane on the basis of the fitness.

The obstacle detector may detect an obstacle when the number of obstacle candidate areas that are determined by the plane assumption verifier not to belong to a plane on which a vehicle travels satisfies a predetermined condition.

The image processing apparatus may further include an obstacle position estimating unit for estimating the position of the obstacle in a current frame on the basis of motion of each of the detected obstacle candidate areas. An image processing method according to another aspect of the present invention includes an image input step of inputting time-series images; an obstacle candidate area tracking step of setting an obstacle candidate area in a specific area of each of the input time-series images and tracking the candidate area in the images; a plane assumption verifying step of determining, using the tracking result of tracking a group of three or more candidate areas, whether or not the candidate areas belong to a specific plane; and an obstacle detecting step of detecting an obstacle using the result of verifying the plane assumption. The obstacle candidate area tracking step includes a line segment detecting step of detecting a line segment in a specific direction from the specific area of each of the input time-series images; an obstacle candidate area generating step of generating an obstacle candidate area in the vicinity of the detected line segment; a search area setting step of setting an area in the vicinity of the line segment in the specific direction, which is detected in each image frame, as a search area for the obstacle candidate area; and an obstacle candidate area searching step of searching the search area for an area having a feature similar to an image feature in the obstacle candidate area. According to the present invention, using a single television camera, an obstacle is reliably detected with a low computational cost on the basis of the motion parallax between the road surface and the obstacle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
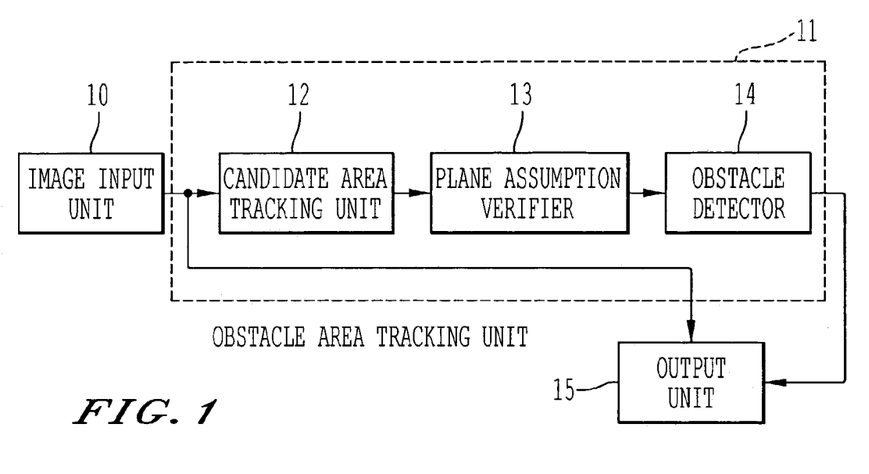
FIG. 1 is a block diagram of the configuration of an image processing apparatus according to an embodiment of the present invention.

Referring now to the drawings, wherein like reference numerals designate identical or corresponding parts throughout the several views, and more particularly to FIG. 1 thereof, FIG. 1 shows an example of the basic configuration of an image processing apparatus according to an embodiment of the present invention. In a non-vehicle image input unit 10, a single television camera, which serves as an imaging unit, captures video images outside the vehicle, particularly images of an anterior view from the vehicle, and generates time-series images. A candidate area tracking unit 12 of an obstacle area tracking unit 11 sets an obstacle candidate area in each captured image and tracks the obstacle candidate area in the images. A plane assumption verifier 13 selects a group of three or more candidate areas and, on the basis of their tracking result, determines whether or not the candidate area group belongs to a specific plane (e.g., road surface). On the basis of the verification result by the plane assumption verifier 13, an obstacle detector 14 detects an obstacle and computes the position of the obstacle.

Of the components of the obstacle area tracking unit 11, the candidate area tracking unit 12, the plane assumption verifier 13, and the obstacle detector 14 will now be described in detail. In order to simplify the description, it is assumed that the television camera is arranged so that the road surface in the images on the television camera occupies the lower half of the images and that the optical axis is parallel to the road surface and the traveling direction. Even if the television camera is arranged differently, a similar method is applicable with simple extension.

Figure 2:
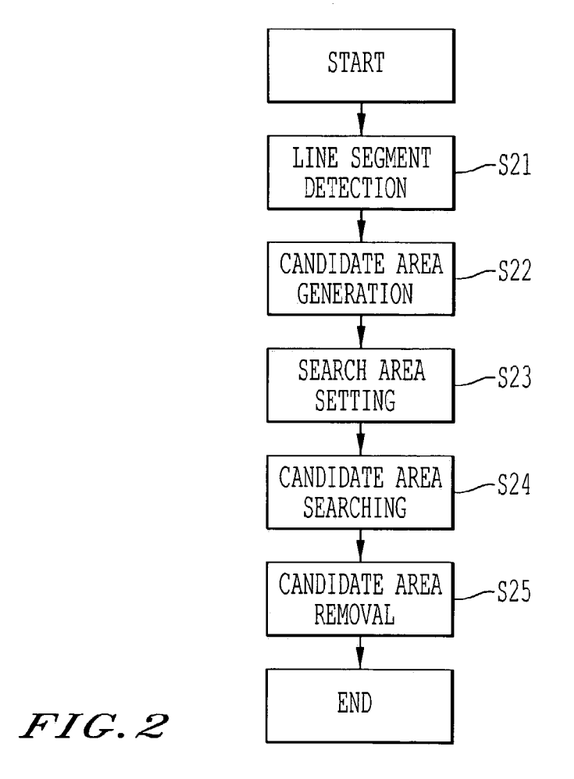
FIG. 2 is a block diagram of an example of a candidate area tracking unit shown in FIG. 1.

FIG. 2 shows an example of the detailed configuration of the candidate area tracking unit 12. Line segment detection block S21 detects a line segment in a specific direction in a detection area for detecting an obstacle. The detection area may be set by various methods. For example, the following methods can be used:

1) The overall screen serves as a detection area;
2) An area below the vanishing point serves as a detection area;
3) A fixed area having a lateral width that becomes narrower as it gets closer to the vanishing point serves as a detection area;
4) A lane or road on which the vehicle travels is detected by image processing, and the internal area of the detected lane or road serves as a detection area; and
5) The vehicle's traveling path is estimated from values measured by sensors, such as a steering wheel rudder angle sensor or a gyroscope, for detecting the traveling state of the vehicle, and an area in the vicinity of the vehicle's traveling path serves as a detection area.

The vehicle has many horizontal lines, such as a ground line between the road and the vehicle, the outer border of the vehicle, the outer border of a bumper, and a window frame. With the television camera arranged as assumed above, these horizontal lines are horizontal lines in the images. Hence, these horizontal lines are detected. Although a case in which horizontal lines are used will now be described below, line segments in other directions may be used.

Since the horizontal lines are observed as edges (pixels with large brightness changes) in the images, the horizontal lines are detected using an edge detection operator, such as the Sobel operator. A horizontal line is detected by connecting edges that have large output values of the edge detection operator and that are in a direction close to the horizontal direction. Another possible method uses separability of features (brightness or the like) between two areas (K. Fukui, "Edge extraction method based on separability of image features," IEICE Trans. Inf. & Syst., Vol. E-7 8-D, No. 12, 1995).

Figure 3:
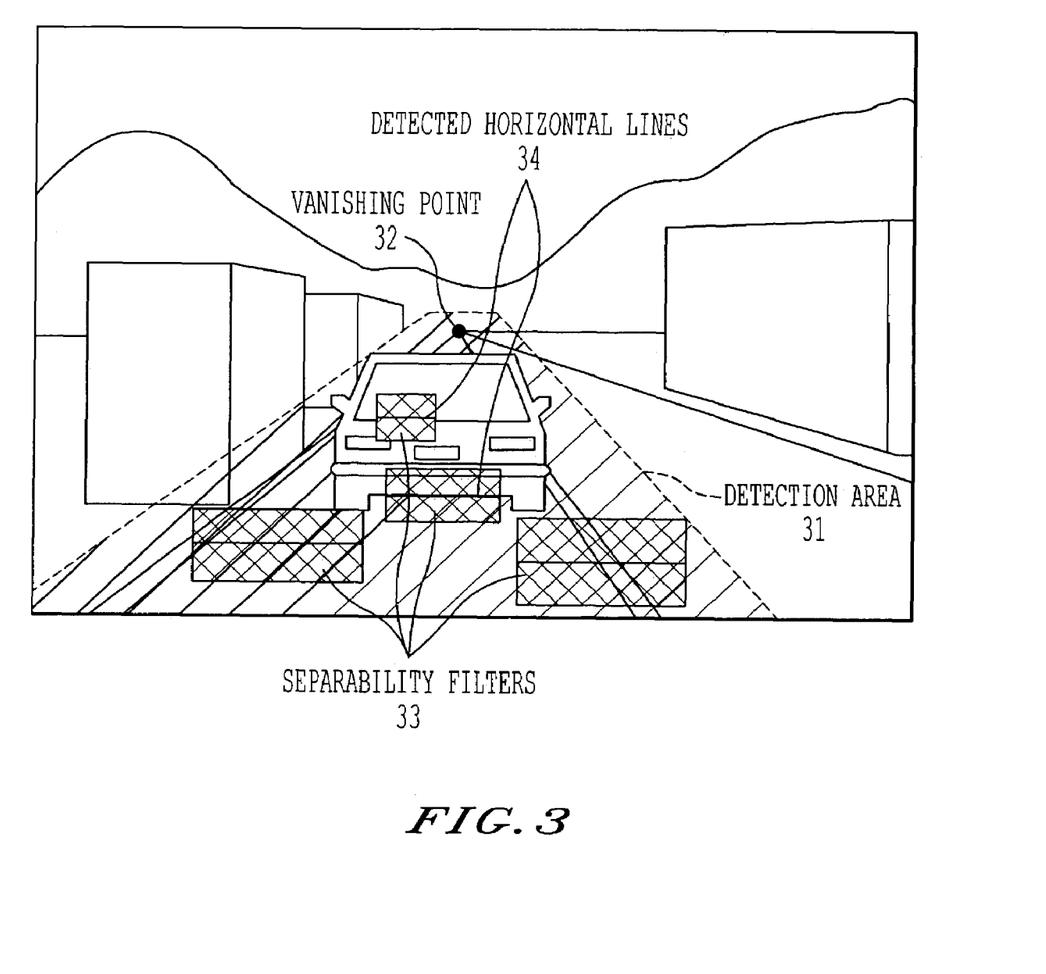
FIG. 3 is an illustration of a horizontal line detecting method.

Referring to FIG. 3, a detection area 31 is a fixed area whose lateral width becomes narrower as it gets closer to the vanishing point 32. FIG. 3 describes a case in which horizontal lines are detected using a separability filter 33. In order that the separability filter detects a horizontal line, the separability filter consists of vertically aligned two areas, namely, a top area and a bottom area, as shown in FIG. 3. An area to which the separability filter is applied is moved to various locations within the detection area, and the separability of brightness between the two areas is computed.

A profile of the separability in the vertical direction or direction toward the vanishing point is generated. The boundary between the two areas of the separability filter at a position with a local maxima in the profile of the separability is detected as a horizontal line. The size of the separability filter is changed, for example, in accordance with the longitudinal distance from the vanishing point in the detection area. In other words, the smaller the longitudinal distance from the vanishing point, the smaller the size of the separability filter becomes.

Figure 4:
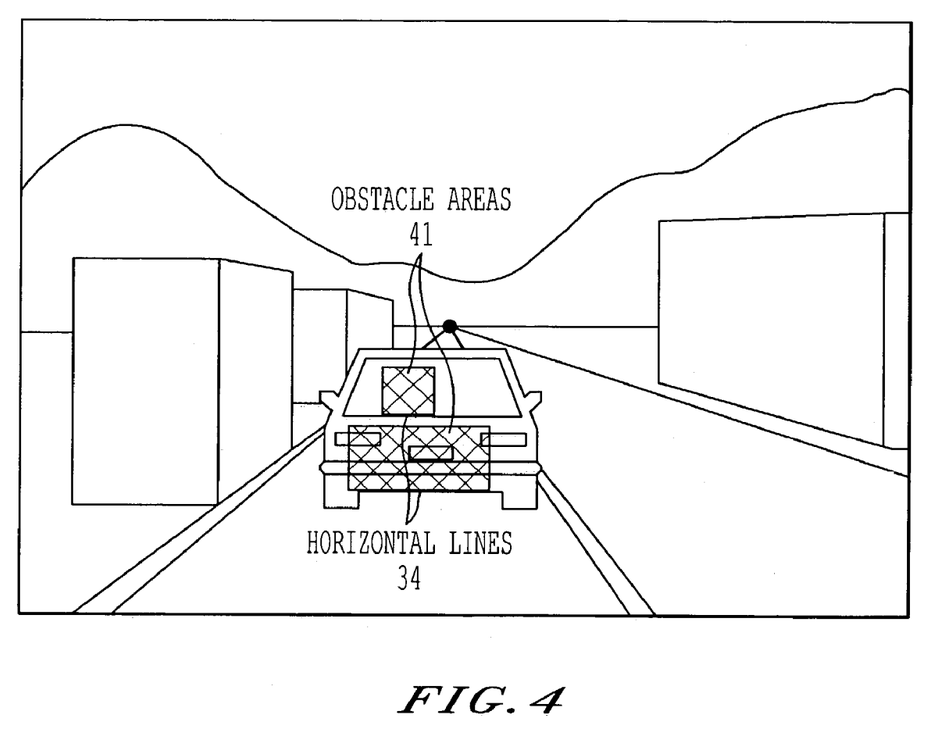
FIG. 4 is an illustration of a method of setting an obstacle candidate area.

Candidate area generating block S22 shown in FIG. 2 sets a candidate area in the vicinity of the detected horizontal line. Taking into consideration the possibility of the horizontal line being the ground line between the road surface and the vehicle, since a portion above the horizontal line corresponds to the vehicle, an area above the detected horizontal line is set as a candidate area (obstacle area 41). FIG. 4 illustrates this case. For example, the size of the candidate area becomes smaller as it gets closer to the vanishing point. Since the vehicle has textures, such as a tail lamp, headlight, and a registration plate, only an area containing a texture is selected from among the candidate areas set as described above.

Figure 5:
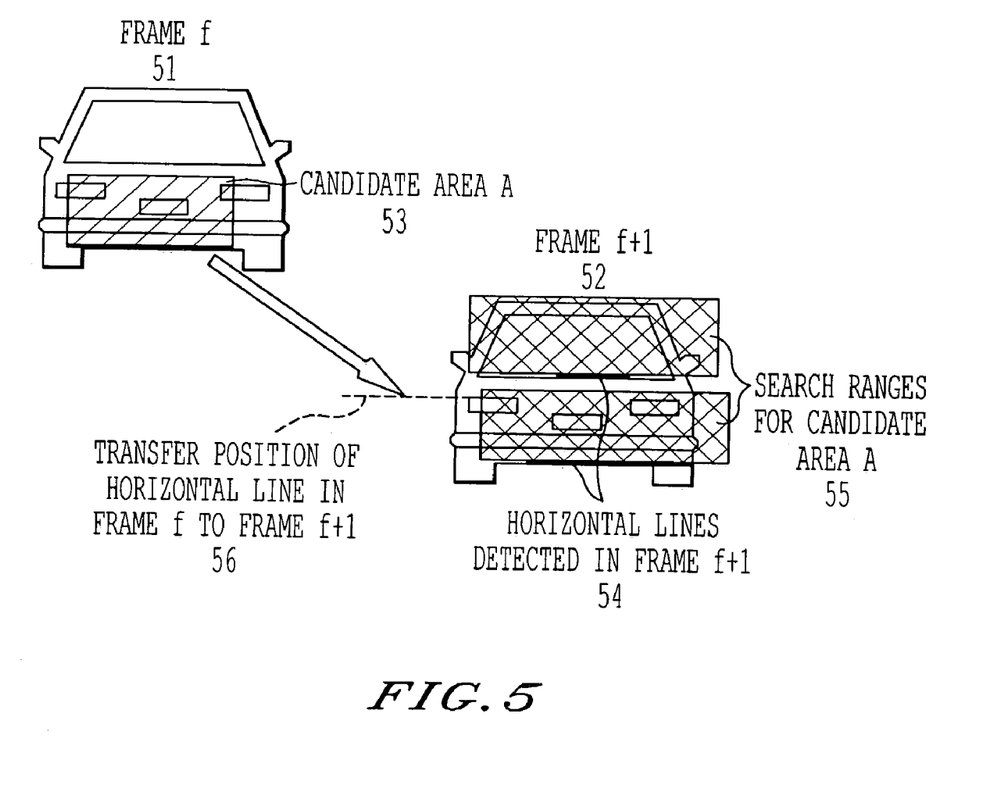
FIG. 5 is an illustration of a method of setting a search range for the candidate area, which is part of tracking the obstacle candidate area.

Search area setting block S23 shown in FIG. 2 sets a search range (area) for estimating the motion of the obstacle candidate area from frame f to frame f+1. Since the obstacle candidate area is set above the horizontal line, it is assumed that the moved obstacle candidate area in the subsequent frame is above the horizontal line. Referring to FIG. 5, in the vicinity of candidate area A 53 in frame f 51, a search area 55 is set as a rectangular area above each horizontal line 54 detected in the subsequent frame f+1. The height of each search area is the same as that of the candidate area A 53, and the width of each search area is slightly greater than that of the candidate area A 53.

Obstacle candidate area searching block S24 shown in FIG. 2 arranges areas having the same shape as the candidate area A 53 (template) in frame f 51 at various positions in each search area set in frame f+1 52, computes the sum of absolute differences (SAD) between the brightness of each of these areas and the brightness of the candidate area A 53 in frame f 51, and detects the area with the smallest SAD as an obstacle candidate area in frame f+1 52. After tracking the obstacle candidate area in each frame, the template is updated to the position based on the tracking result 56.

The size of the obstacle candidate area may be fixed, as described above. Alternatively, the size of the obstacle candidate area may be changed in accordance with the relative position of the obstacle candidate area from the vanishing point every time the template is updated. For example, the smaller the longitudinal distance from the vanishing point to the obstacle candidate area, the smaller the size of the obstacle candidate area becomes. Instead of using the SAD with respect to brightness values, such a search may be conducted using various features, such as the sum of squares of differences (SSD) with respect to brightness values, the coefficient of correlation with respect to brightness values, the SAD or the SSD with respect to gradient of brightness, the difference in the direction of the edge (Orientation code matching: F. Ullah, S. Kaneko, and S. Igarashi, "Object search using orientation code matching," Proc. of IAPR Workshop on Machine Vision Applications, pp. 262-266, 2000), or the SAD or SSD with respect to RGB values of color images.

The template may be updated in each frame, as described above. Alternatively, the template in the frame in which the obstacle candidate area is set may not be updated. Alternatively, the template may be updated when the obstacle candidate area moves by a preset distance.

Obstacle candidate area removal block S25 shown in FIG. 2 selects and removes a candidate area that is failed to be tracked. A candidate area is eliminated when satisfying at least one of the following conditions:

1) The candidate area comes to the end of the screen;
2) An evaluation value (SAD or the like) in searching the candidate area is poor;
3) The candidate area contains no textures; and
4) A motion of the candidate area is irregular (e.g., when the motion differs greatly from uniform motion).

Figure 6:
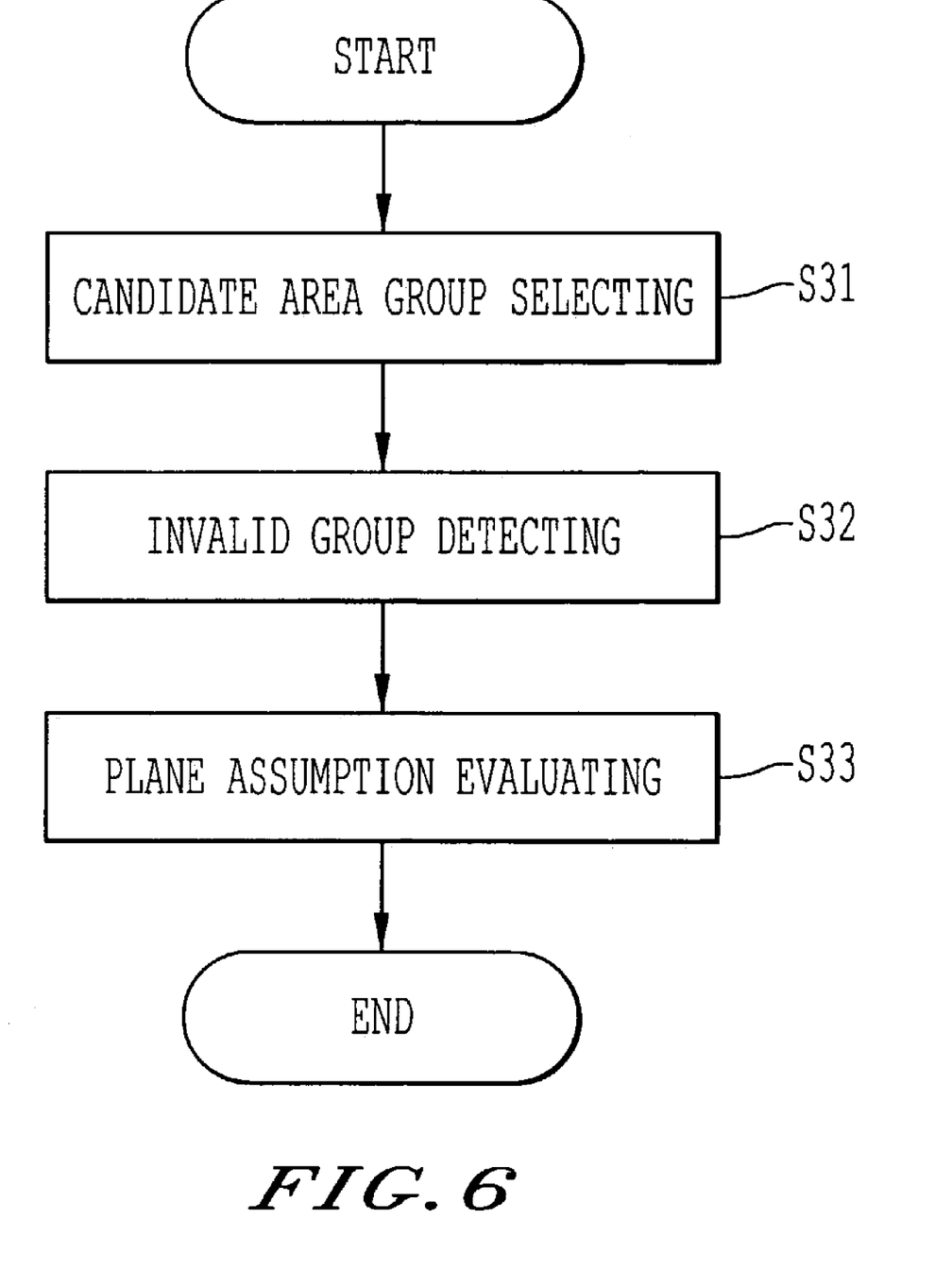
FIG. 6 is a block diagram of the configuration of an example of a plane assumption verifier shown in FIG. 1.

Referring to FIG. 6, the plane assumption verifier 13 shown in FIG. 1 includes candidate area group selecting block S31 for selecting a candidate area group consisting of three or more candidate areas; invalid group detecting block S32 for determining whether or not to perform determination to which plane the candidate area group belongs; and plane assumption evaluating block S33 for determining to which plan the candidate area group belongs.

A case is described in which it is determined to which of two planes, namely, the road surface and a plane perpendicular to the road surface and the vehicle's traveling direction (hereinafter referred to as a vertical plane), the candidate area group belongs. Candidate area group selecting block S31 randomly selects, from candidate areas being tracked currently, three candidate areas close to one another in the horizontal direction.

Figure 7:
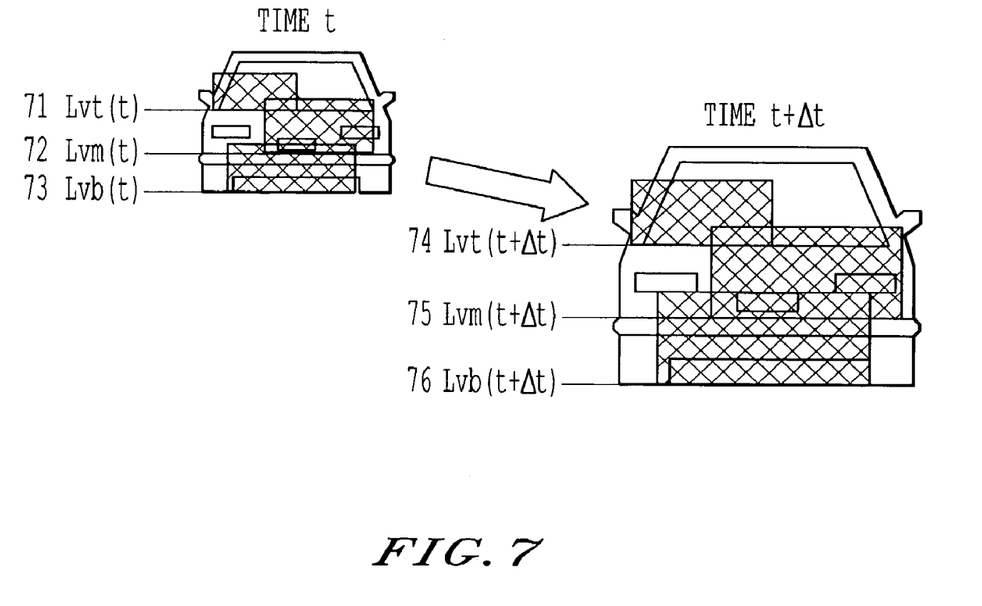
FIG. 7 is an illustration of a case in which candidate areas belong to a plane perpendicular to the road surface and the optical axis of the television camera.

FIG. 7 illustrates a case in which the candidate area group belongs to the vertical plane (e.g., rear of the vehicle).

The longitudinal position of the top candidate area $L_{vt}(t)$ 71, the longitudinal position of the middle candidate area $L_{vm}(t)$ 72, and the longitudinal position of the bottom candidate area $L_{vb}(t)$ 73 at time t moves to $L_{vt}(t+\Delta t)$ 74, $L_{vm}(t+\Delta t)$ 75, $L_{vb}(t+\Delta t)$ 76, respectively, at subsequent time t+Δt. In such a case, when all the candidate areas are in a vertical plane of a rigid object, the following equation holds true:

$$\frac{L_{vt}(t) - L_{vm}(t)}{L_{vt}(t+\Delta t) - L_{vm}(t+\Delta t)} = \frac{L_{vm}(t) - L_{vb}(t)}{L_{vm}(t+\Delta t) - L_{vb}(t+\Delta t)} \quad (1)$$
$$= \frac{L_{vb}(t) - L_{vt}(t)}{L_{vb}(t+\Delta t) - L_{vt}(t+\Delta t)}$$

When the candidate area group belongs to the road surface, as in the case of the vertical plane, let the longitudinal distances from the vanishing point to the positions of the candidate areas be $L_{ht}(t)$, $L_{hm}(t)$, $L_{hb}(t)$, $L_{ht}(t+\Delta t)$, $L_{hm}(t+\Delta t)$, and $L_{hb}(t+\Delta t)$. The following equations hold true:

$$\frac{1}{L_{hb}(t)} - \frac{1}{L_{hm}(t)} = \frac{1}{L_{hb}(t+\Delta t)} - \frac{1}{L_{hm}(t+\Delta t)} \quad (2)$$
$$\frac{1}{L_{hm}(t)} - \frac{1}{L_{ht}(t)} = \frac{1}{L_{hm}(t+\Delta t)} - \frac{1}{L_{ht}(t+\Delta t)}$$
$$\frac{1}{L_{ht}(t)} - \frac{1}{L_{hb}(t)} = \frac{1}{L_{ht}(t+\Delta t)} - \frac{1}{L_{hb}(t+\Delta t)}$$

Invalid group detecting block S32 detects that the motion of the candidate area group does not match either the motion of the road surface or the motion of the vertical plane on the basis of at least one of the following determination criteria:

1) The longitudinal motion of the candidate area in a candidate area group does not decrease monotonously as the longitudinal position of the candidate area is close to the vanishing point;
2) The longitudinal motion of the candidate areas of the candidate area group are not in the same direction;
3) The longitudinal positional order of the candidate areas of the candidate area group changes (reverses) during the tracking; and
4) The horizontal speeds of the candidate areas of the candidate area group greatly differ from one another.

If at least one of the above determination criteria is satisfied, plane assumption evaluating block S33 does not perform determination to which plane this candidate area group belongs. Alternatively, of the candidate areas of the candidate area group satisfying at least one of the determination criteria, at least one candidate area to remove may be determined on the basis of a criterion, e.g., whether or not motion is at a constant speed, and this candidate area may be removed.

Plane assumption evaluating block S33 determines to which of the road surface and the vertical plane the motion of the candidate area group fits. For each candidate area group, a fitness between the motions of the candidate areas and a motion constraint on the vertical plane (equation (1)) and a goodness of fit between the motion of each candidate area and a motion constraint for the road surface (equations (2)) are computed. The plane to which the candidate area group belongs is determined by selecting the plane for which the fitness is higher.

A fitness to the vertical plane $s_v$ is computed as follows. The magnification m of the longitudinal distance between the candidate areas is determined by:

$$m = \frac{L_{vb}(t+\Delta t) - L_{vt}(t+\Delta t)}{L_{vb}(t) - L_{vt}(t)} \quad (3)$$

With the magnification m, assuming that the candidate areas are on the vertical plane, the positions $L_{vt}^P(t+\Delta t)$ and $L_{vm}^P(t+\Delta t)$ at time t+Δt are computed by:

$$L_{vt}^P(t+\Delta t) = L_{vb}(t+\Delta t) - m \times (L_{vb}(t) - L_{vt}(t))$$

$$L_{vm}^P(t+\Delta t) = L_{vb}(t+\Delta t) - m \times (L_{vb}(t) - L_{vm}(t)) \quad (4)$$

The fitness to the vertical plane $s_v$ is computed by:

$$s_v = |L_{vt}^P(t+\Delta t) - L_{vt}(t+\Delta t)| + |L_{vm}^P(t+\Delta t) - L_{vm}(t+\Delta t)| \quad (5)$$

Fitness to the road surface $s_h$ is computed as follows. Using equations (2), assuming that the candidate areas are on the road surface, the positions $L_{ht}^P(t+\Delta t)$ and $L_{hm}^P(t+\Delta t)$ at time t+Δt are computed by:

$$L_{ht}^P(t+\Delta t) = \frac{1}{\frac{1}{L_{ht}(t)} - \frac{1}{L_{hb}(t)} + \frac{1}{L_{hb}(t+\Delta t)}} \quad (6)$$

$$L_{hm}^P(t+\Delta t) = \frac{1}{\frac{1}{L_{hm}(t)} - \frac{1}{L_{hb}(t)} + \frac{1}{L_{hb}(t+\Delta t)}} \quad (7)$$

The fitness to the road surface $s_h$ is computed by:

$$s_h = |L_{ht}^P(t+\Delta t) - L_{ht}(t+\Delta t)| + |L_{hm}^P(t+\Delta t) - L_{hm}(t+\Delta t)| \quad (8)$$

The smaller fitness $s_v$ or $s_h$, the better the candidate area group fits to the motion constraint for the corresponding plane. When $s = s_h - s_v$ or an accumulated value of s over time exceeds a positive threshold, it is determined that the candidate area group belongs to the vertical plane. When s falls below a negative threshold, it is determined that the candidate area group belongs to the road surface.

Since the constraint equation (1) for the vertical plane is based on the positional difference in the images, equation (1) holds true even when there is a shift in the longitudinal direction of the images, that is, rotation of the camera due to unevenness of the road surface. On the other hand, the constraint equations (2) for the road surface are based on the positions from the vanishing point. When the position of the vanishing point, which is the point at infinity in the images, changes due to a shift in the longitudinal direction of the images, equations (2) may not hold true even when the candidate area group is on the road surface. In order to prevent this problem, when computing the fitness $s_h$ to the road surface using equations (6), (7), and (8), $s_h$ is computed by changing $L_{hb}(t+\Delta t)$ within a range in which the screen may be shifted due to unevenness of the road surface, and the minimum $s_h$ is selected.

$$s_h = \frac{\min s_h(d)}{|d| < D}$$

$$s_h(d) = |L_{ht}^P(t+\Delta t, d) - L_{ht}(t+\Delta t)| + |L_{hm}^P(t+\Delta t, d) - L_{hm}(t+\Delta t)| \quad (9)$$

$$L_{ht}^P(t+\Delta t, d) = \frac{1}{\frac{1}{L_{ht}(t)} - \frac{1}{L_{hb}(t)} + \frac{1}{L_{hb}(t+\Delta t) + d}} \quad (10)$$

$$L_{hm}^P(t+\Delta t, d) = \frac{1}{\frac{1}{L_{hm}(t)} - \frac{1}{L_{hb}(t)} + \frac{1}{L_{hb}(t+\Delta t) + d}} \quad (11)$$

Depending on how the constraint equations (1) and (2) are selected, the fitness may be computed by equations other than those described above. The number of candidate areas belonging to one candidate area group is not limited to three and can be a value greater than three. In the latter case, the present invention is easily extended by a similar discussion.

Figure 8:
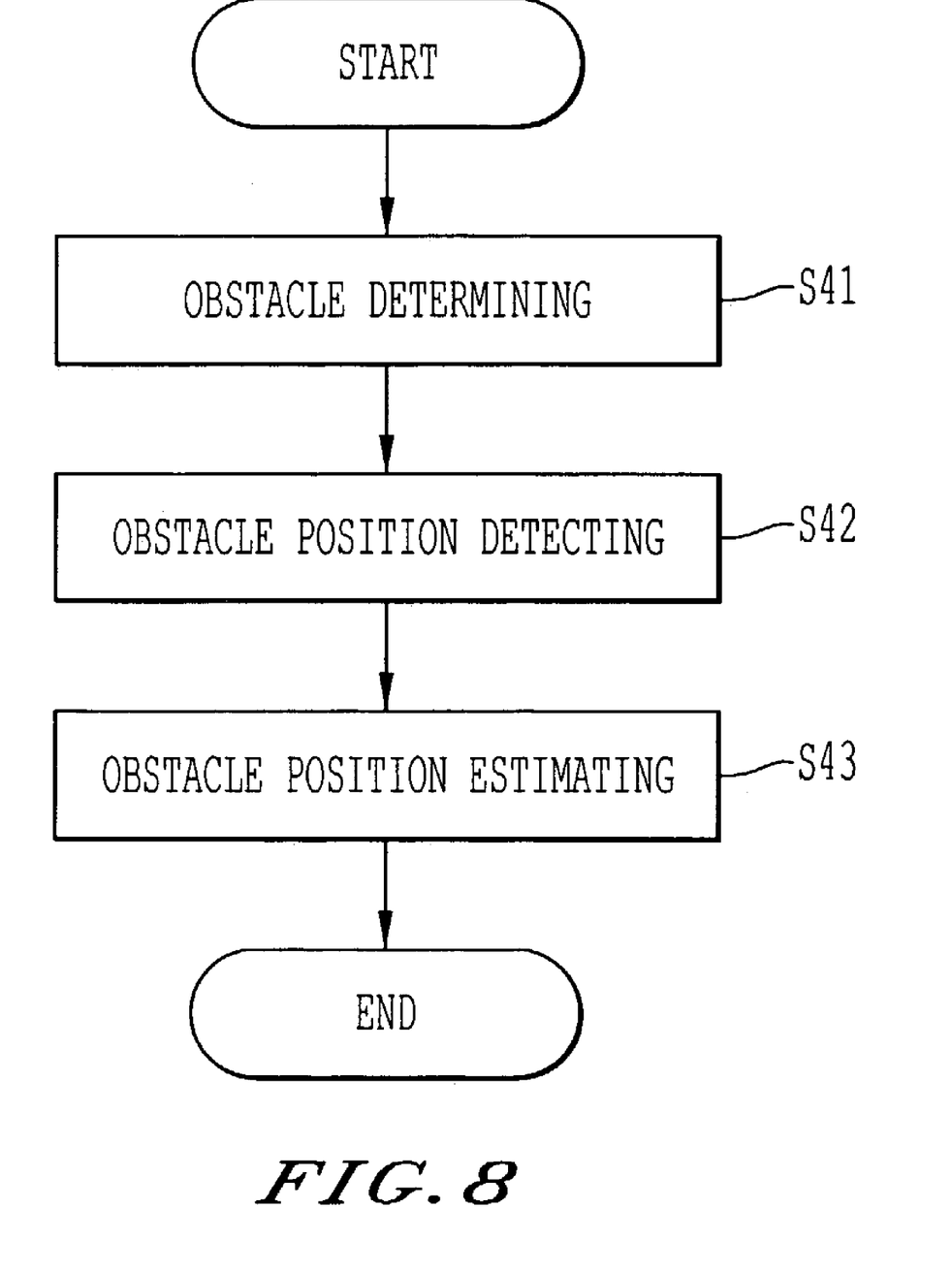
FIG. 8 is a block diagram of an example of an obstacle detector shown in FIG. 1.

Referring to FIG. 8, the obstacle detector 14 includes obstacle determining block S41, obstacle position detecting block S42, and obstacle position estimating block S43.

Obstacle determining block S41 determines whether or not there is an obstacle (vertical plane) using many determination results by plane assumption evaluating block S33. For a candidate area A, let NA be the number of candidate area groups containing the candidate area A as the bottom area on the screen. Let Nv be the number of candidate area groups that are determined, by plane assumption evaluating block S33, to belong to vertical planes. When Nv/NA exceeds a particular threshold, it is determined that there is an obstacle.

Obstacle position detecting block S42 detects a set of candidate areas determined to belong to an obstacle as an obstacle area in the image. The bottom position of the obstacle area may be detected as the ground line between the road surface and the obstacle. When the television camera's position and angle relative to the road surface and the television camera's internal parameters are known in advance, the distance from the vehicle to the obstacle is computed using the position of the ground line in the image.

Figure 9:
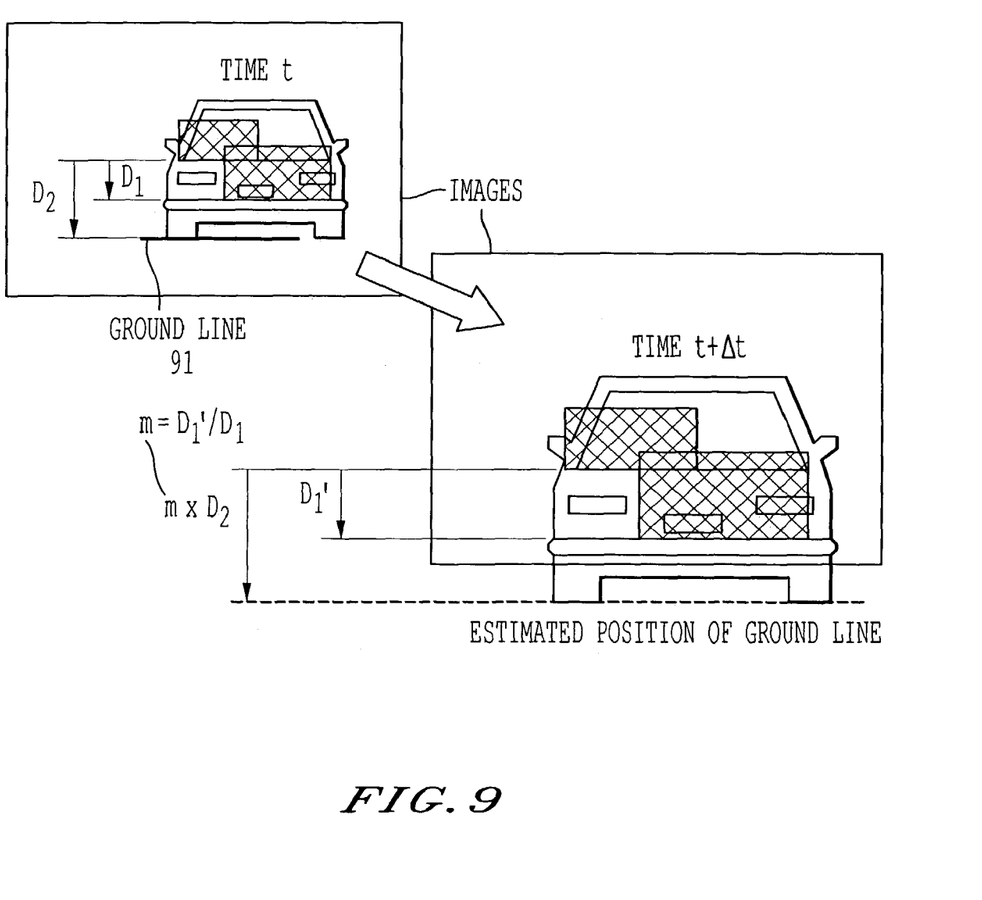
FIG. 9 is an illustration of a technique for estimating a ground line.

When the obstacle becomes too close to the television camera and hence the ground line becomes out of the screen or when the ground line cannot be detected for any reason, obstacle position estimating block S43 estimates the current position of the ground line (distance to the obstacle) from the result of tracking the candidate areas (see FIG. 9). The candidate area immediately above the position observed as the ground line 91 in each of the past frames is assumed to belong to an obstacle (vertical plane). From the results of tracking these candidate areas, the magnification (reduction) m of the longitudinal interval (D1, D1', D2, and D2') between the candidate areas at time t and time t+$\Delta$t is computed by m=D1'/D1. Using the computed magnification m, as in equations (4), the ground line that cannot be observed in the current frame (estimated position of the ground line) is estimated.

According to this embodiment of the present invention, an image captured toward the anterior of the vehicle (traveling direction) is used to detect an obstacle in front of the vehicle (e.g., preceding vehicle). However, the present invention is not limited to this embodiment. For example, even when an image captured toward the posterior of the vehicle (opposite direction to the traveling direction) is used, a three-dimensional object behind the vehicle (e.g., succeeding vehicle) may be detected using a similar technique. This is applicable to detection of a succeeding vehicle to prevent collision of the succeeding vehicle with a preceding vehicle. Using an image captured of a portion posterior to the vehicle, a vehicle overtaking the vehicle or a vehicle overtaken by the vehicle may be detected.

Numerous modifications and variations of the present invention are possible in light of the above teachings. It is therefore to be understood that within the scope of the appended claims, the invention may be practiced otherwise than as specifically described herein.

The invention claimed is:

1. An image processing apparatus comprising:
   means for inputting a plurality of frame images serving as video images;
   means for detecting, from each frame image in the plurality of frame images, a horizontal line in a three dimensional space, the horizontal line being parallel to an image plane of the respective video image;
   means for generating an obstacle candidate area as an image area in a vicinity of the detected horizontal line;
   means for tracking the obstacle candidate area in an image succeeding each frame image in the plurality of frame images, and producing a tracking result for the obstacle candidate area;
   means for determining, using the tracking result of three or more obstacle candidate areas, whether the three or more obstacle candidate areas belong to a plane extending in a specific direction in the three dimensional space and producing a determination result; and
   means for detecting an obstacle based on the determination result,
   wherein the means for determining includes:
   means for selecting a candidate area group consisting of three or more obstacle candidate areas; and
   means for computing a fitness between the candidate area group and a predetermined plane and evaluating whether the candidate area group belongs to the predetermined plane based on the fitness.

2. The image processing apparatus according to claim 1, wherein the means for determining determines whether the three or more obstacle candidate areas belong to a horizontal plane.

3. The image processing apparatus according to claim 1, wherein the means for tracking includes:
   means for setting an image area in a vicinity of the detected horizontal line as a search area for the obstacle candidate area; and
   means for tracking the obstacle candidate area by comparing an image feature in the obstacle candidate area with an image feature in the search area.

4. The image processing apparatus according to claim 1, wherein the means for tracking eliminates the obstacle candidate area when a trajectory of the obstacle candidate area tracked over the plurality of frame images is not smooth.

5. The image processing apparatus according to claim 1, wherein means for detecting an obstacle detects when a number of obstacle candidate areas that are determined by the means for determining not to belong to the specific plane is greater than a predetermined number.

6. The image processing apparatus according to claim 1, further comprising:

means for estimating a position of the obstacle in a frame image based on a motion of the three or more obstacle candidate areas.

7. An image processing apparatus comprising:
a camera configured to input a plurality of frame images serving as video images;
a tracking unit configured to detect a horizontal line in a three dimensional space, the horizontal line being parallel to an image plane of the respective video image, in each of the plurality of frame images, to generate an obstacle candidate area as an image area in a vicinity of the straight-line component, to track the obstacle candidate area in an image succeeding each frame image in the plurality of frame images, and to produce a tracking result for the obstacle candidate area; and
a detector configured to determine, using the tracking result of three or more obstacle candidate areas, whether the plural obstacle candidate areas belong to a plane extending in a specific direction in a three dimensional space and configured to detect an obstacle based on the determination,
wherein the detector is configured to select a candidate area group consisting of three or more obstacle candidate areas, to compute a fitness between the candidate area group and a predetermined plane, and to evaluate whether the candidate area group belongs to the predetermined plane based on the fitness.

8. The image processing apparatus according to claim 7, wherein the detector is configured to determine whether the three or more obstacle candidate areas belong to a horizontal plane.

9. The image processing apparatus according to claim 7, wherein the tracking unit is configured to set an image area in a vicinity of the detected horizontal line as a search area for the obstacle candidate area and to track the obstacle candidate area by comparing an image feature in the obstacle candidate area with an image feature in the search area.

10. The image processing apparatus according to claim 7, wherein the tracking unit is configured to eliminate the obstacle candidate area when a trajectory of the obstacle candidate area tracked over the plurality of frame images is not smooth.

11. The image processing apparatus according to claim 7, wherein the detector is configured to detect an obstacle when a number of obstacle candidate areas that are determined not to belong to the specific plane is greater than a predetermined number.

12. The image processing apparatus according to claim 7, wherein the detector is configured to estimate a position of the obstacle in a frame image based on a motion of the three or more obstacle candidate areas.

13. An image processing method executed using an image processing apparatus having an obstacle detection unit, comprising: Inputting a plurality of frame images serving as video images; detecting, using the image processing apparatus and from each frame image in the plurality of frame images, a straight line component in a horizontal direction in a three dimensional space, the horizontal line being parallel to an image plane of the respective video image,
generating an obstacle candidate area as an image area in a vicinity of the detected straight-line component;
tracking the obstacle candidate area in an image succeeding each frame image in the plurality of frame images, and producing a tracking result for the obstacle candidate area;
determining, using the image processing apparatus and using the tracking result of three or more obstacle candidate areas, whether the three or more obstacle candidate areas belong to a plane extending in a specific direction in a three dimensional space, and producing a determination result, the determining further including selecting a candidate area group consisting of three or more obstacle candidate areas, and computing a fitness between the candidate area group and a predetermined plane and evaluating whether the candidate area group belongs to the predetermined plane based on the fitness; and
detecting, using the image processing apparatus, an obstacle based on the determination result.

14. The image processing method according to claim 13, wherein the determining step determines whether the three or more obstacle candidate areas belong to a horizontal plane.

15. The image processing method according to claim 13, wherein the tracking step includes:
setting an image area in a vicinity of the detected horizontal line as a search area for the obstacle candidate area; and
tracking the obstacle candidate area by comparing an image feature in the obstacle candidate area with an image feature in the search area.

16. An image processing apparatus comprising:
means for inputting a plurality of frame images serving as video images;
means for detecting, from each frame image in the plurality of frame images, plural horizontal lines in a three dimensional space, the horizontal lines being parallel to an image plane of the respective video image, by applying an edge-detection filter;
means for generating an obstacle candidate area as an image area in a vicinity of the detected straight-line component;
means for tracking the obstacle candidate area in an image succeeding each frame image in the plurality of frame images based on information extracted by image processing, and producing a two-dimensional position in the image as a tracking result for each obstacle candidate area;
means for determining, using the change of relative two-dimensional positions of three or more obstacle candidate regions between two or more image frames in the plurality of image frames, whether the three or more obstacle candidate areas belong to a plane extending in a specific direction in a three dimensional space and producing a determination result; and
means for detecting an obstacle based on the determination result,
wherein the means for detecting selects a candidate area group consisting of three or more obstacle candidate areas, computes a fitness between the candidate area group and a predetermined plane, and evaluates whether the candidate area group belongs to the predetermined plane based on the fitness.

* * * * *